(12) United States Patent
Coleman et al.

(10) Patent No.: US 11,295,253 B2
(45) Date of Patent: Apr. 5, 2022

(54) METHOD AND APPARATUS FOR ASSET MANAGEMENT

(71) Applicant: Copperleaf Technologies Inc., Vancouver (CA)

(72) Inventors: Stanley Thomas Coleman, North Vancouver (CA); John Klippenstein, New Westminster (CA); Alejandro Erickson, Burnaby (CA); James Burberry, London (GB)

(73) Assignee: Copperleaf Technologies Inc., Vancouver (CA)

( * ) Notice: Subject to any disclaimer, the term of this patent is extended or adjusted under 35 U.S.C. 154(b) by 225 days.

(21) Appl. No.: 16/701,898

(22) Filed: Dec. 3, 2019

(65) Prior Publication Data

US 2021/0166173 A1 Jun. 3, 2021

(51) Int. Cl.
*G06Q 10/00* (2012.01)
*G06Q 10/06* (2012.01)
(Continued)

(52) U.S. Cl.
CPC . *G06Q 10/06312* (2013.01); *G06Q 10/06315* (2013.01); *H02J 3/0075* (2020.01);
(Continued)

(58) Field of Classification Search
CPC ....... G06Q 10/06312; G06Q 10/06315; G06Q 50/06; G06Q 10/08; G06Q 10/087;
(Continued)

(56) References Cited

U.S. PATENT DOCUMENTS

| 6,731,999 B1 | 5/2004 | Yang et al. |
| 7,937,280 B1 | 5/2011 | Leung et al. |

(Continued)

FOREIGN PATENT DOCUMENTS

| CA | 2594322 A1 | 1/2008 |
| CA | 2616627 A1 | 12/2008 |

(Continued)

OTHER PUBLICATIONS

The International Search Report And The Written Opinion for application PCT/US2020/058522, dated Jan. 28, 2021.

*Primary Examiner* — Richard Tan
(74) *Attorney, Agent, or Firm* — Moser Taboada

(57) ABSTRACT

Methods and apparatus for asset management are provided. The apparatus, for example, a processor to receive an input including intervention information for a first plurality of assets in a first circuit and for a second plurality of assets in a second circuit in a network; create a first plurality of bundling strategies for interventions to be performed for the first plurality of assets in the first circuit and create a second plurality of bundling strategies for interventions to be performed for the second plurality of assets in the second circuit; calculate for a created first plurality of bundling strategies and a created second plurality of bundling strategies at least one of an outage duration and cost associated with the interventions; and create a schedule for performing interventions for the first plurality of assets in the first circuit and the second plurality of assets in the second circuit.

18 Claims, 4 Drawing Sheets

(51) Int. Cl.
*H02J 3/46* (2006.01)
*H02J 3/14* (2006.01)
*H02J 3/00* (2006.01)
*H02J 3/18* (2006.01)
*G06Q 50/06* (2012.01)

(52) U.S. Cl.
CPC ................ *H02J 3/144* (2020.01); *H02J 3/18* (2013.01); *H02J 3/466* (2020.01); *G06Q 50/06* (2013.01)

(58) Field of Classification Search
CPC ..... G06Q 10/0875; G06Q 10/00; H02J 3/466; H02J 3/144; H02J 3/0075; H02J 3/18; Y02B 70/3225; Y04S 20/222
USPC ....................................................... 705/7.22
See application file for complete search history.

(56) References Cited

U.S. PATENT DOCUMENTS

| | | | |
|---|---|---|---|
| 8,504,402 | B1 | 8/2013 | Tiao et al. |
| 9,655,207 | B2 | 5/2017 | Monaci et al. |
| 10,021,771 | B1 | 7/2018 | Dableh |
| 10,212,789 | B2 | 2/2019 | Schröder et al. |
| 2002/0156542 | A1 | 10/2002 | Nandi |
| 2011/0258124 | A1 | 10/2011 | Emmett et al. |
| 2013/0024131 | A1* | 1/2013 | Lamontagne ......... H01F 27/402 702/24 |
| 2013/0064079 | A1 | 3/2013 | Zhang |
| 2014/0006088 | A1 | 1/2014 | Coleman et al. |
| 2014/0358601 | A1* | 12/2014 | Smiley ............... G06Q 10/0635 705/7.11 |
| 2018/0067765 | A1 | 3/2018 | Ra et al. |
| 2018/0347408 | A1 | 12/2018 | Collins et al. |
| 2019/0079505 | A1 | 3/2019 | Wu et al. |

FOREIGN PATENT DOCUMENTS

| | | | |
|---|---|---|---|
| CN | 104834294 A | | 8/2015 |
| EP | 0953929 A2 | | 11/1999 |
| JP | 2008216003 A | | 9/2008 |
| WO | WO-199203905 A2 | | 3/1992 |
| WO | WO-199956232 A1 | | 11/1999 |
| WO | WO-2015132687 A1 | | 9/2015 |
| WO | WO2015132717 | * | 11/2015 |

* cited by examiner

Constants (specified or pre-computed) 502:
OutageDuration_TransformerMaintenance
OutageDuration_CircuitBreakerMaintenance
CostPerDayOfOutage
ValueOfTransformerMaintenance_2020
ValueOfTransformerMaintenance_2021
ValueOfCircuitBreakerMaintenance_2020
ValueOfCircuitBreakerMaintenance_2021
ResourceUsage_TransformerMaintenance
ResourceUsage_CircuitBreakerMaintenance
MaxResourceUsage_2020
MaxResourceUsage_2021

Binary Decision variables 504:
Decision_Transformer_Maintenance_2020
Decision_Transformer_Maintenance_2021
Decision_CircuitBreaker_Maintenance_2020
Decision_CircuitBreaker_Maintenance_2021

Bounded Continuous Decision variables 504:
Decision_OutageDuration_BundleOne_2020 <= 365
Decision_OutageDuration_BundleOne_2021 <= 365

Constraints that only one alternative is selected per asset 504:
Decision_Transformer_Maintenance_2020
+ Decision_Transformer_Maintenance_2021
= 1
Decision_CircuitBreaker_Maintenance_2020
+ Decision_CircuitBreaker_Maintenance_2021
= 1

Resource Constraints 506:
ResourceUsage_TransformerMaintenance * Decision_Transformer_Maintenance_2020
 + ResourceUsage_CircuitBreakerMaintenance * Decision_CircuitBreaker_Maintenance_2020
 <= MaxResourceUsage_2020
ResourceUsage_TransformerMaintenance * Decision_Transformer_Maintenance_2021
 + ResourceUsage_CircuitBreakerMaintenance * Decision_CircuitBreaker_Maintenance_2021
 <= MaxResourceUsage_2021

Outage length Constraints 506:
- OutageDuration_TransformerMaintenance * Decision_Transformer_Maintenance_2020
+ Decision_OutageDuration_BundleOne_2020 >= 0
- OutageDuration_TransformerMaintenance * Decision_Transformer_Maintenance_2021
+ Decision_OutageDuration_BundleOne_2021 >= 0
- OutageDuration_CircuitBreakerMaintenance * Decision_CircuitBreaker_Maintenance_2020
+ Decision_OutageDuration_BundleOne_2020 >= 0
- OutageDuration_CircuitBreakerMaintenance * Decision_CircuitBreaker_Maintenance_2021
+ Decision_OutageDuration_BundleOne_2021 >= 0

Objective function 506:
ValueOfTransformerMaintenance_2020 * Decision_Transformer_Maintenance_2020
+ ValueOfTransformerMaintenance_2021 * Decision_Transformer_Maintenance_2021
+ ValueOfCircuitBreakerMaintenance_2020 * Decision_CircuitBreaker_Maintenance_2020
+ ValueOfCircuitBreakerMaintenance_2021 * Decision_CircuitBreaker_Maintenance_2021
- CostPerDayOfOutage * Decision_OutageDuration_BundleOne_2020
- CostPerDayOfOutage * Decision_OutageDuration_BundleOne_2021

FIG. 5

METHOD AND APPARATUS FOR ASSET MANAGEMENT

FIELD

The present disclosure relates, generally, to methods and apparatus used for asset management, and more particularly, to methods and apparatus that use an asset intervention bundling algorithm for scheduling interventions for one or more assets in a circuit of a network maintained by a user.

BACKGROUND

Many businesses face challenges in managing large numbers of pieces of equipment or other assets, e.g., utility poles (e.g., power lines), assets on circuits in a transmission network, pipeline, railroad tracks, cable, etc. The assets maintained by a typical larger organization is a complex system that requires maintenance to continue to operate smoothly to provide production for the organization. Furthermore, many organizations have a sufficiently large pool of assets which can make it impossible to maintain production without careful scheduling of maintenance and replacement of various assets.

For example, some organizations, e.g., a power company, can have in excess of thirty thousand assets (e.g., circuits, relays, transformers, etc.) on a plurality of circuits of an electrical transmission network that need to be maintained and sometimes repaired, upgraded, replaced, or refurbished. For example, some organizations can take preemptive steps (e.g., interventions) to minimize a likelihood of failure of an asset. Accordingly, when assets on a circuit of the electrical transmission network need maintenance, for example, one or more segments, e.g., circuits, of the electrical transmission network may need to be disabled for the maintenance to occur, which can be costly for the power company. As can be appreciated, when multiple interventions for a plurality of assets need to be performed, outage costs associated with disabling the multiple segments on the electrical transmission can be even more costly for the power company.

Accordingly, the inventors have provided methods and apparatus that use an asset intervention bundling algorithm for scheduling interventions for one or more assets in a circuit of a network maintained by a user.

SUMMARY

In accordance with an aspect of the present disclosure, there is provided an asset management apparatus. The asset management apparatus includes an input/output device; and a processor programmed to: receive an input from a user via the input/output device, the input including intervention information for a first plurality of assets in a first circuit and for a second plurality of assets in a second circuit in a network maintained by the user; create a first plurality of bundling strategies for interventions to be performed for the first plurality of assets in the first circuit and create a second plurality of bundling strategies for interventions to be performed for the second plurality of assets in the second circuit; calculate for a created first plurality of bundling strategies and a created second plurality of bundling strategies at least one of an outage duration and cost associated with the interventions to be performed for the first plurality of bundling strategies and the second plurality of bundling strategies; create a schedule for performing interventions for the first plurality of assets in the first circuit and the second plurality of assets in the second circuit based on a calculated at least one of the outage duration and cost associated with the interventions to be performed for the first plurality of bundling strategies and the second plurality of bundling strategies; and upon receiving a request from the user, output a result of a created schedule for performing the interventions for the first plurality of assets in the first circuit and the second plurality of assets in the second circuit to the user via one of a display of the input/output device or remote electronic device in communication with the asset management apparatus.

In accordance with an aspect of the present disclosure, there is provided a method for asset management comprising: receiving an input from a user via the input/output device, the input including intervention information for a first plurality of assets in a first circuit and for a second plurality of assets in a second circuit in a network maintained by the user; creating a first plurality of bundling strategies for interventions to be performed for the first plurality of assets in the first circuit and create a second plurality of bundling strategies for interventions to be performed for the second plurality of assets in the second circuit; calculating for a created first plurality of bundling strategies and a created second plurality of bundling strategies at least one of an outage duration and cost associated with the interventions to be performed for the first plurality of bundling strategies and the second plurality of bundling strategies; creating a schedule for performing interventions for the first plurality of assets in the first circuit and the second plurality of assets in the second circuit based on a calculated at least one of the outage duration and cost associated with the interventions to be performed for the first plurality of bundling strategies and the second plurality of bundling strategies; and upon receiving a request from the user, outputting a result of a created schedule for performing the interventions for the first plurality of assets in the first circuit and the second plurality of assets in the second circuit to the user via one of a display of the input/output device or remote electronic device in communication with the asset management apparatus In accordance with an aspect of the present disclosure, there is provided a non-transitory computer readable storage medium having stored thereon a plurality of instructions that when executed by a processor of an asset management apparatus perform a method for asset management. The method includes receiving an input from a user via the input/output device, the input including intervention information for a first plurality of assets in a first circuit and for a second plurality of assets in a second circuit in a network maintained by the user; creating a first plurality of bundling strategies for interventions to be performed for the first plurality of assets in the first circuit and create a second plurality of bundling strategies for interventions to be performed for the second plurality of assets in the second circuit; calculating for a created first plurality of bundling strategies and a created second plurality of bundling strategies at least one of an outage duration and cost associated with the interventions to be performed for the first plurality of bundling strategies and the second plurality of bundling strategies; creating a schedule for performing interventions for the first plurality of assets in the first circuit and the second plurality of assets in the second circuit based on a calculated at least one of the outage duration and cost associated with the interventions to be performed for the first plurality of bundling strategies and the second plurality of bundling strategies; and upon receiving a request from the user, outputting a result of a created schedule for performing the interventions for the first plurality of assets in the first circuit and the second plurality of assets in the second circuit to the user via one of a display of the input/output device or remote electronic device in communication with the asset management apparatus.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

FIG. 5 is a diagram of a control algorithm including a series of equations used in conjunction with the method of FIG. 4, in accordance an embodiment of the present disclosure.

Figure 1:
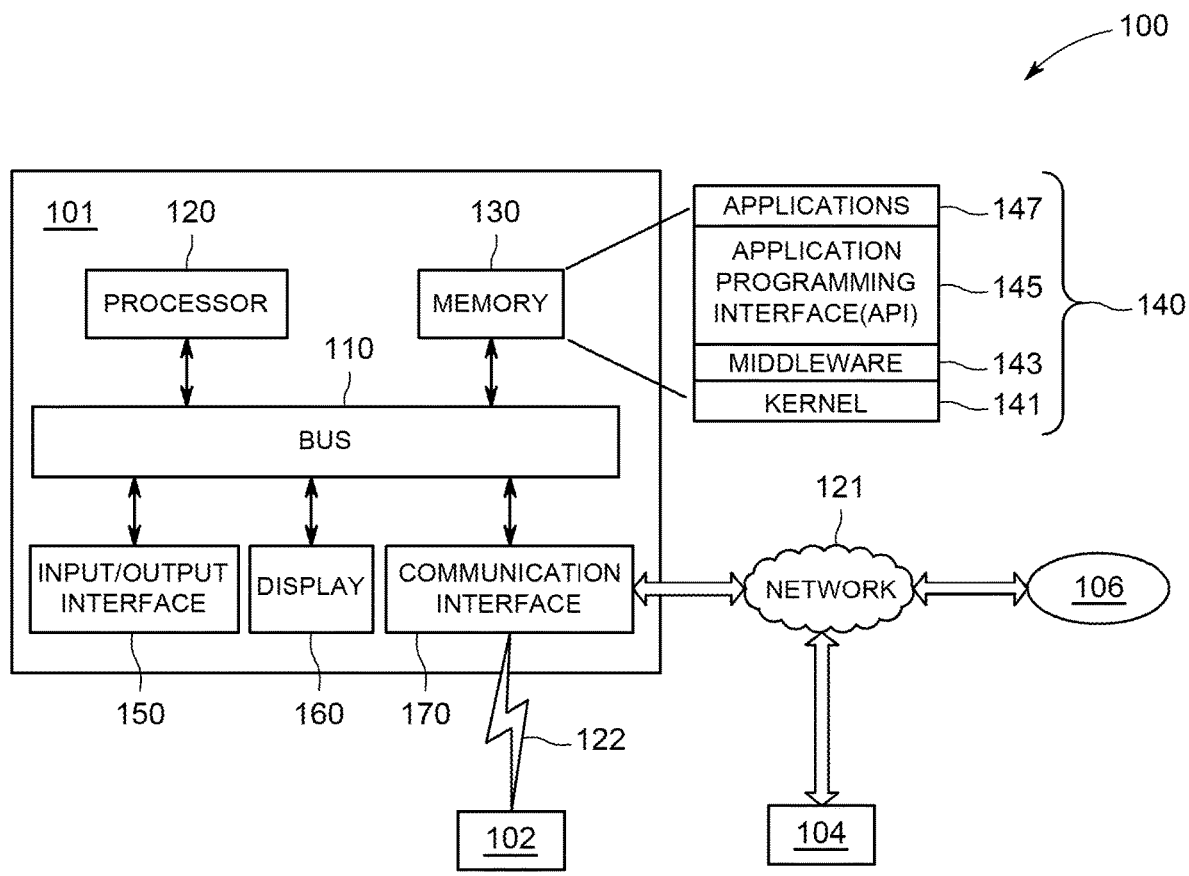
FIG. 1 is a diagram of an asset management device, in accordance with an embodiment of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Referring to FIG. 1, a diagram of an asset management apparatus embodied in an electronic device 101 (e.g., desktop computer, PC, mobile phone, laptop, server, cloud-based server, or other suitable computing device) that is configured to operate in a network environment 100 is shown. The electronic device 101 includes a bus 110, a processor 120, a memory 130, an input/output device 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include one or more of a CPU, an application processor (AP), and/or a communication processor (CP). The processor 120 controls at least one of the other components of the electronic device 101 and/or processing data or operations related to communication. The processor 120, for example, can use one or more control algorithms (asset intervention bundling algorithms), which can be stored in the memory 130, to perform a method (e.g., a method 400) for asset management, as will be described in greater detail below.

The memory 130, which can be a non-transitory computer readable storage medium, may include volatile memory and/or non-volatile memory. The memory 130 stores data or commands/instructions related to at least one of other components of the electronic device 101. The memory 130 stores software and/or a program module 140. For example, the program module 140 may include a kernel 141, middleware 143, an application programming interface (API) 145, application programs (or applications) 147, etc. The kernel 141, the middleware 143 or at least part of the API 145 may be called an operating system (OS).

The kernel 141 controls or manages system resources (e.g., the bus 110, the processor 120, the memory 130, etc.) used to execute operations or functions of other programs (e.g., the middleware 143, the API 145, and the applications 147). The kernel 141 provides an interface capable of allowing the middleware 143, the API 145, and the applications 147 to access and control/manage the individual components of the electronic device 101, e.g., when performing an asset bundling routine or operation.

The middleware 143 may be an interface between the API 145 or the applications 147 and the kernel 141 so that the API 145 or the applications 147 can communicate with the kernel 141 and exchange data therewith. The middleware 143 processes one or more task requests received from the applications 147 according to a priority. For example, the middleware 143 assigns a priority for use of system resources of the electronic device 101 (e.g., the bus 110, the processor 120, the memory 130, etc.) to at least one of the applications 147. For example, the middleware 143 processes one or more task requests according to a priority assigned to at least one application program, thereby performing scheduling or load balancing for the task requests. For example, when executing the applications 147, which can include an asset management application (e.g., including an intervention scheduler for scheduling interventions for one or more assets), different priorities can be assigned to one or more tasks of the asset management application so that a task having a higher priority can be performed prior to a task having a lower priority, e.g., storing data input by a user can have a relatively high priority, while updating intervention information of an asset in a database of the memory 130 can have a relatively low priority.

The API 145 may be an interface that is configured to allow the applications 147 to control functions provided by the kernel 141 or the middleware 143. The API 145 may include at least one interface or function (e.g., instructions) for file control, window control, image process, text control, or the like.

The input/output device 150 is capable of transferring instructions or data, received from the user or one or more remote (or external) electronic devices 102, 104 or the server 106, to one or more components of the electronic device 101. For example, the input/output device 150 can receive an input, e.g., entered via the display 160, a keyboard, or verbal command, from a user. The input can include information, e.g., intervention information, relating to assets maintained by the user, or the input can be in the form of a request, e.g., when an asset has been selected for maintenance, repair, replacement, or refurbishment, as will be described in greater detail below. The input/output device 150 is capable of outputting instructions or data, which can be received from one or more components of the electronic device 101, to the user or remote electronic devices.

The display 160 may include a liquid crystal display (LCD), a flexible display, a transparent display, a light emitting diode (LED) display, an organic LED (OLED) display, micro-electromechanical systems (MEMS) display, an electronic paper display, etc. The display 160 displays various types of content (e.g., texts, images, videos, icons, symbols, etc.). The display 160 may also be implemented with a touch screen. In this case, the display 160 receives touches, gestures, proximity inputs or hovering inputs, via a stylus pen, or a user's body.

The communication interface 170 establishes communication between the electronic device 101 and the remote electronic devices 102, 104 or a server 106 (which can include a group of one or more servers and can be a cloud-based server) connected to a network 121 via wired or wireless communication. The electronic device 101 may employ cloud computing, distributed computing, or client-server computing technology when connected to the server 106.

Wireless communication may employ, as cellular communication protocol, at least one of long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM), which can be used for global navigation satellite systems (GNSS). The GNSS may include a global positioning system (GPS), global navigation satellite system (Glonass), Beidou GNSS (Beidou), Galileo, the European global satellite-based navigation system, according to GNSS using areas, bandwidths, etc. Wireless communication may also include short-range communication 122. Short-range communication may include at least one of wireless fidelity (Wi-Fi), Bluetooth (BT), near field communication (NFC), and magnetic secure transmission (MST).

Wired communication may include at least one of universal serial bus (USB), high definition multimedia interface (HDMI), recommended standard 232 (RS-232), and plain old telephone service (POTS). The network 121 may include at least one of the following: a telecommunications network, e.g., a computer network (e.g., local area network (LAN) or wide area network (WAN)), the Internet, and a telephone network.

Each of the remote electronic devices 102 and 104 and/or the server 106 may be of a type identical to or different from that of the electronic device 101. All or some of the operations performed in the electronic device 101 may be performed in the remote electronic devices 102, 104 or the server 106. When the electronic device 101 has to perform some functions or services automatically or in response to a request (e.g., when using the asset management application), the electronic device 101 may make a request for performing at least some functions relating thereto to the remote electronic device 102 or 104 or the server 106, instead of performing the functions or services by itself. The remote electronic devices 102, 104 or the server 106 may execute the requested functions or the additional functions, and may deliver a result of the execution to the electronic device 101. The electronic device 101 may provide the received result as it is or additionally process the received result and provide the requested functions or services. To achieve this, for example, cloud computing, distributed computing, or client-server computing technology may be used.

An asset management application (e.g., the application 147) includes a plurality of instructions that are executable by the processor 120 using the API 145. The asset management application can be downloaded from the server 106 (or the remote electronic device 104) via the Internet over the network 121 (or from the remote electronic device 102 via, for example, the short-range communication 122) and installed in the memory 130 of the electronic device 101.

When assets fail, e.g., a transformer becomes inoperable, there are consequences, e.g., outages to customers, repair costs to fix the asset, safety to employees and/or the public, fire hazard, etc. Consequences of failures of assets can be estimated and monetized based on attributes of the assets (e.g., capacity, redundancy of circuit, etc.). Similarly, a condition of a failure (e.g., a likelihood of failure) for an asset can be evaluated based on, for example, a combination of inspection information and parameters relating to the asset (e.g., installation date, environment in which the asset is subjected to, and the like). A future condition of an asset can be estimated based on an expected degradation of the asset using, for example, statistical analysis (e.g., history of failure of similar assets). Moreover, a current and future probability of a failure mode (e.g., cause of failure) of an asset can be estimated based on a current and expected future condition of the asset, and a risk over time for each failure of the asset can be computed as a product of the probability and consequence of each failure of the asset.

The inventors have found that a number of alternative interventions, however, can be performed for an asset (e.g., major/minor maintenance, repair, updating, refurbishment, replacement, etc.) to reduce or eliminate a probability of failure of an asset. Scheduling an intervention for an asset in a circuit of a network, however, sometimes requires that the circuit containing the asset be taken out of service (e.g., service is not available to the customers). For example, if an asset in a circuit is a transformer and an intervention scheduled for the transformer is for minor maintenance (e.g., change oil of the transformer), the circuit in which the transformer is located needs to be taken out of service. There are cost efficiencies associated with bundling interventions (e.g., for different assets) to occur in the same outage of service (e.g., crew mobilization costs can be reduced). Additionally, a total duration of the outage of service to customers can be reduced by bundling the interventions for the assets, as opposed to having separate outages of service to customers for each intervention. For example, an intervention that includes performing maintenance of a transformer in a circuit may be scheduled for the same outage of the circuit as an intervention that includes repairing a relay on that circuit.

An optimization problem, however, may be subject to constraints that cross circuit boundaries as resources and costs are sometimes shared between two or more circuits (e.g., assets are located in different circuits). Therefore, an aspect of the present disclosure provides an intervention scheduler for scheduling interventions for each asset of a plurality of assets in corresponding circuits of a transmission network (e.g., for bundling two or more interventions for a plurality of assets), while taking into account the benefits of scheduling interventions for each asset in a same outage, e.g., subject to cost, resource, outage, and/or risk constraints.

Calculating an intervention schedule for assets that are part of different circuits, however, is complex. For example, as each circuit in a transmission network can include more than one hundred assets—each of which can have from three to fifteen different types of interventions occurring in their operable lifetime—and a transmission network can include greater than thirty-thousand assets, it is difficult, if not impossible, to calculate an overlapped duration for scheduling interventions in a single circuit or across multiple circuits.

Accordingly, the inventors have found that inefficient algorithms that use complex calculations can be replaced, for example, with more efficient algorithms that use two or more simpler calculations (e.g., stages). More particularly, the inventors have found that if the non-linear outage constraints are not considered for scheduling interventions across circuits, multiple stage mixed integer linear programming (MILP) algorithms (FIG. 5) (or models or equations) or other appropriate techniques can be used to calculate an intervention schedule for one or more assets in a single circuit or across multiple circuits. The non-linear constraints can be, for example, a constraint that cannot be expressed in a linear form. For example, the non-linear constraint can be constraints on outage durations and outage costs associated with performing interventions for one or more assets in one or more corresponding circuits. Accordingly, if there are multiple assets on a circuit or across multiple circuits, an outage duration and/or outage cost can be determined by a non-linear equation, as described in more detail below.

More particularly, a first stage MILP algorithm is configured to calculate for each asset in a circuit of a transmission network multiple intervention schedules by varying one or more of resource constraints, cost constraints, which are linear constraints, and/or a simplified duration and/or cost of outages, and a plurality of bundled intervention schedules for each asset in each of the circuits is created. Thereafter, for each of the resulting bundled intervention schedules calculated for each asset based on the linear constraints, complex outage durations and costs (e.g., non-linear constraints) are computed. Next, each of the bundled intervention schedules for each asset in each circuit in the transmission network calculated using the first stage MILP algorithm are inputted to a second stage MILP algorithm that is configured to calculate a system wide intervention schedule for each asset of each circuit of the transmission network. That is, since the bundled intervention schedules inputted to the second stage MILP algorithm have been calculated taking into account the outage durations and costs (e.g., the non-linear constraints), the second stage MILP algorithm can be used to calculate the system wide intervention schedule for each asset of each circuit in the transmission network.

Figure 2:
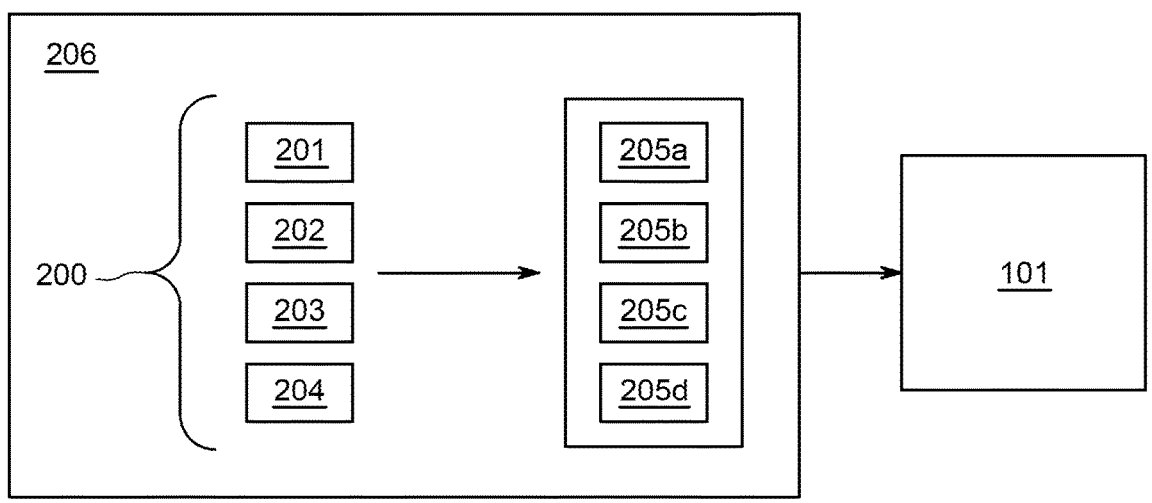
FIG. 2 is a block diagram of a transmission network and an asset management device, in accordance with an embodiment of the present disclosure.
Figure 3A:
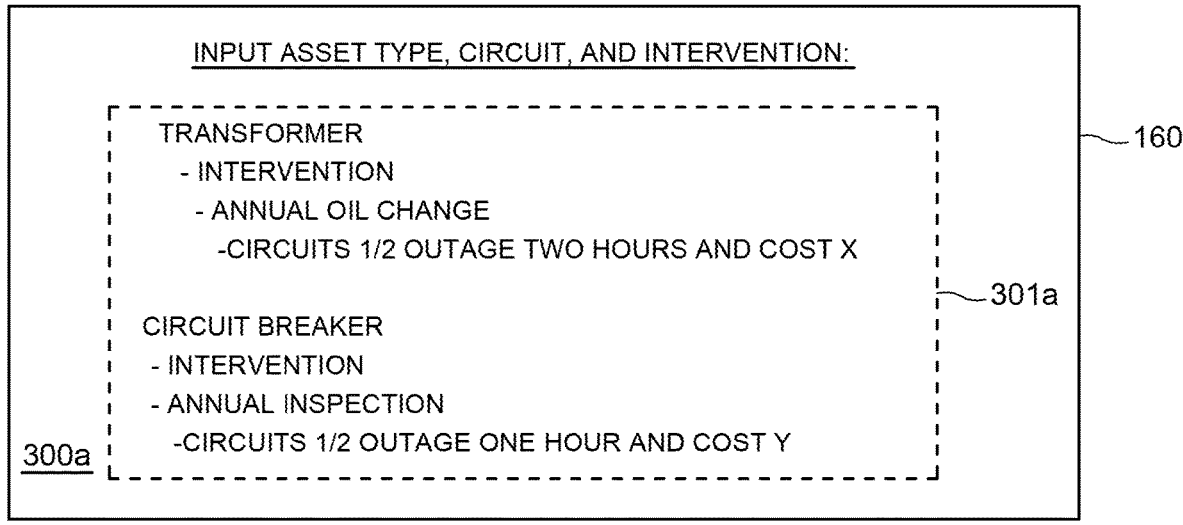
FIGS. 3A and 3B are diagrams of graphical user interfaces (GUIs), in accordance with an embodiment of the present disclosure.
Figure 3B:
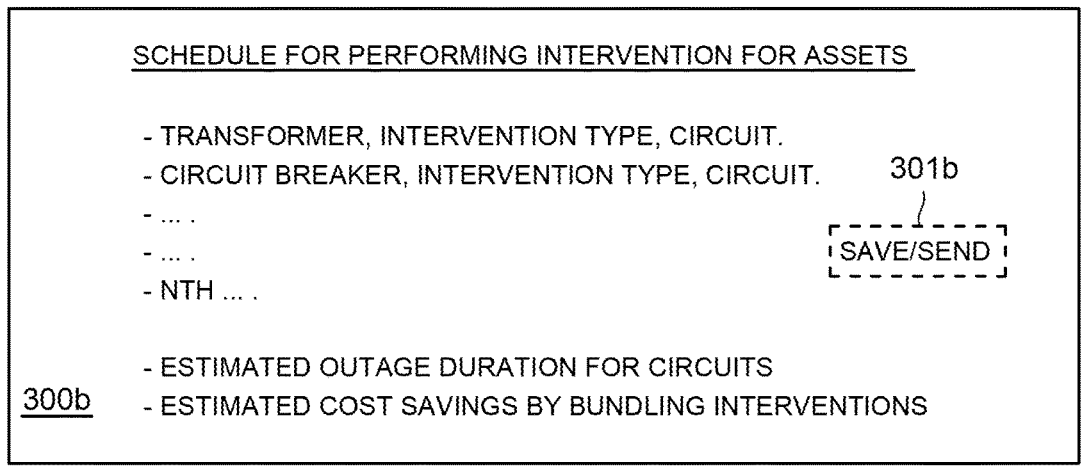

FIG. 2 is a block diagram of a transmission network and an asset management device, and FIGS. 3A and 3B are diagrams of graphical user interfaces (GUIs), in accordance with an embodiment of the present disclosure. For illustrative purposes, it is assumed that the assets which require managing are a plurality of assets 200 (shown schematically) in a network 206 (e.g., power line network) maintained by the user. For example, the plurality of assets can include, but are not limited to, a circuit breaker 201, a power line 202 (e.g., overhead cable, underground cable, transmission tower, and the like), a transformer 203, or a relay 204, each of which can be part of a plurality of circuits 205$a$-205$d$ in the network 206.

During an initial set-up of the asset management application on the electronic device 101, the processor 120 can display one or more a GUIs on the display 160 requesting that a user input information relating to one or more types of assets that require intervention scheduling including, but not limited to, maintenance, repair, upgrading, refurbishment, replacement, etc. For example, the processor 120 can display a GUI 300$a$ (FIG. 3A) requesting that a user input information (see FIG. 4 at 402 and FIG. 5 at 502) relating to the assets to be managed by the asset management application, so that the processor 120 can determine a bundling strategy for interventions to be performed for a plurality of assets (e.g., a first plurality of assets and a second plurality of assets) in a corresponding circuit or across two or more circuits (e.g., two or more independent electrical circuits). Additionally, a user can input information relating to budget constraints for maintaining all assets in the network 206. The budget constraints can include, for example, an annual budget, e.g., ten billion dollars, that is allocated by a company for maintaining all assets in the network 206.

For illustrative purposes, the GUI 300$a$ is shown including information for the assets including the transformers 203 in the circuits 205$a$, 205$b$ (e.g., circuits ½) and the circuit breakers 201 in circuits 205$a$, 205$b$ (e.g., circuits ½). Additionally, with respect to the transformers 203, the user can input information relating to a type of intervention for the transformers 203 (e.g., oil change), a time frame in which that intervention will take, e.g., circuits ½ outage two hours, and a cost of the outage (e.g., cost (x)). With respect to the circuit breakers 201, the user can input information relating to a type of intervention for the circuit breakers 201 (e.g., inspection), a time frame in which that intervention will take, e.g., circuits ½ outage one hour, and a cost of the outage (e.g., cost (y)).

After the information relating to the assets are input, the processor 120 can display a selectable area 301$a$ on the display 160 so that the user can review/edit the information in the selectable area 301$a$, and can upload and store the information in the memory 130 during the initial set-up. The information relating to the asset can also be uploaded and stored in a memory of the server 106, i.e., when the electronic device 101 uses an asset management application that is being executed at the server 106.

Next, at 404, the processor 120, using the information relating to the assets, can create a first plurality of bundling strategies for interventions to be performed for a first plurality of assets in a first circuit (e.g., the circuit breaker 201 and transformer 203 in the circuit 205$a$) and create a second plurality of bundling strategies for interventions to be performed for a second plurality of assets in the second circuit (e.g., the circuit breaker 201 and transformer 203 in the circuit 205$b$). For example, the processor 120 can create a plurality of bundling strategies for interventions to be performed for each asset of the first plurality of assets in the first circuit and for each asset of the second plurality of assets in the second circuit by varying at least one parameter (e.g., resource constraints, cost constraints and/or the cost of outages). In at least some embodiments, the at least one parameter can be resource constraints for each asset, cost constraints for each asset, and/or duration and cost of outages for each asset. For example, with respect to the circuit breakers 201 and/or the transformers 203, the resource constraints can include resources (e.g., manpower (with appropriate skills), tools, and the like.) needed for inspecting the circuit breakers 201 and/or changing the oil of the transformers 203. The cost constraints can include the costs associated with inspecting the circuit breakers 201 (e.g., manpower) and the costs associated with changing the oil of the transformers 203 (e.g., manpower, tools, oil, filter, etc.), duration of outage, and the cost of outages can include a cost (e.g., loss of revenue/profits, etc.) associated with an outage of the circuit breakers 201 and/or the transformers 203.

The processor 120, using the first stage MILP algorithm (see 504 in FIG. 5, for example), calculates for a created plurality of bundling strategies a simplified outage duration and/or outage cost associated with the interventions to be performed for each asset of the plurality of assets. More particularly, the algorithms (equations) provided in FIG. 5 are configured for calculating a simplified estimate of the outage duration and/or outage cost calculations for each asset which makes it possible to express the bundling strategies (e.g., first stage optimization) as a MILP problem.

For example, in at least some embodiments, with respect to the circuit breaker 201 and the transformer 203 in the circuit 205a, the processor 120 can calculate the outage duration and/or outage cost. As noted above, the outage duration for inspecting the circuit breaker 201 and the transformer 203 in the circuit 205a is one and two hours, respectively, and the outage cost is cost (y) and cost (x), respectively. Similarly, with respect to the circuit breaker 201 and the transformer 203 in the circuit 205b, the processor 120 can calculate the outage duration and/or outage cost. As noted above, the outage duration for inspecting the circuit breaker 201 and the transformer 203 in the circuit 205b is one and two hours, respectively, and the outage cost is cost (y) and cost (x), respectively.

As can be appreciated the outage duration and outage cost can be dependent on the type of intervention being performed for an asset. For example, in at least some embodiments, the intervention for the transformer 203 in circuit 205a can be replacement of the transformer 203, which can have an outage duration of ten hours and an outage cost of cost (z). Similarly, the intervention for the transformer 203 in circuit 205b can be refurbishment of the transformer 203, which can have an outage duration of twenty hours and an outage cost of cost (z').

The processor 120, using multiple first stage MILP algorithms, with respect to the circuit breaker 201 and the transformer 203 in the circuit 205a, calculates or runs a plurality of bundling strategies (e.g., optimizations) by varying each of the above parameters for the circuit breaker 201 and the transformer 203 in the circuit 205a to determine an optimal bundling strategy for the circuit breaker 201 and the transformer 203. Likewise, with respect to the circuit breaker 201 and the transformer 203 in the circuit 205b, the processor 120, using multiple first stage MILP algorithms, calculates or runs a plurality of bundling strategies (e.g., optimizations) by varying each of the parameters for the circuit breaker 201 and the transformer 203 in the circuit 205b to determine an optimal bundling strategy for the circuit breaker 201 and the transformer 203. That is, the processor 120 can calculate or run two (or more) optimizations for the combination of circuit breaker 201 and the transformer 203 in the circuit 205a and can calculate or run two (or more) optimizations for the combination of circuit breaker 201 and the transformer 203 in the circuit 205b.

The number of bundling strategies that the processor 120 can calculate or run can be arbitrarily picked. In at least some embodiments, for example, the processor 120 can calculate or run as many bundling strategies (e.g., optimizations) for as many assets that are being bundled. For example, if there are five assets in the first circuit and five assets in the second circuit, the processor 120 can calculate or run five or more optimizations for each of the circuits. In at least some embodiments, the processor 120 can calculate less optimizations than there are assets.

Next, at 406, the processor 120 calculates for a created first plurality of bundling strategies (optimizations) and a created second plurality of bundling strategies (optimizations) at least one of an outage duration (and/or outage cost) associated with the interventions to be performed for the first plurality of bundling strategies and the second plurality of bundling strategies (see 506 of FIG. 5, for example). More particularly, for each circuit, as the outage duration (and/or outage cost) associated with performing interventions are calculated based on non-linear resource constraints, the MILP algorithm (e.g., linear algorithm) used at 404 is not suitable at 406. That is, interventions for different assets can be performed serially (i.e., not during the same circuit(s) outage, e.g., interventions scheduled/performed one after the other) or parallelly (i.e., during the same circuit outage(s), e.g., interventions scheduled/performed at the same time) with each other. For example, if an outage duration for the intervention for the transformer 203 in the circuit 205a is four days, an outage duration for the intervention for the circuit breaker 201 in the circuit 205a is one day, an outage duration for the intervention for the transformer 203 in the circuit 205b is four days, and an outage duration for the intervention for the circuit breaker 201 in the circuit 205b is three days, then a total outage duration for the circuit 205a and circuit 205b may not simply be the sum of the total outage durations. That is, the total outage duration required for the intervention for the transformers 203 and the intervention of circuit breakers 201 depends on the resource constraints across the circuits 205a and 205b, e.g., whether the two or more interventions can be performed in parallel or in series. For example, in the previous example, if the four interventions could be performed parallelly, the total outage duration for the circuits 205a and 205b would be four days. Conversely, if the four interventions had to be performed serially, the total outage duration for the circuits 205a and 205b would be twelve days.

Accordingly, the processor 120 uses one or more non-linear equations to compute a value for the outage duration and/or the outage cost for each of the calculated plurality of bundling strategies (or optimizations). The output value, which can be an arbitrary value, is indicative of bundled strategies of interventions that can be performed in parallel. That is, after 406 only the bundled strategies for each of the circuits that can be performed in parallel are input to the second MILP algorithm.

Next, at 408, the processor 120, using the second stage MILP algorithm, creates a schedule for performing interventions for the first plurality of assets in the first circuit (e.g., the transformer 203 and the circuit breaker 201 in the circuit 205a) and the second plurality of assets in the second circuit (e.g., the transformer 203 and the circuit breaker 201 in the circuit 205b) based on a calculated at least one of the outage duration and cost associated with the interventions to be performed for the first plurality of bundling strategies and the second plurality of bundling strategies. More particularly, the processor 120 uses the output from the first MILP algorithm as an input for the second stage MILP algorithm. For example, the output of the first MILP algorithm can include the optimal bundled strategy for the circuit breaker 201 and the transformer 203 in the circuit 205a (e.g., having the non-linear constraints already calculated at 406) and the optimal bundled strategy for the circuit breaker 201 and the transformer 203 in the circuit 205b (e.g., also having the non-linear constraints already calculated at 406). That is, since each of the optimal bundled strategies for the assets in the respective circuits 205a and 205b has the non-linear constraints already calculated (e.g., only bundled strategies that can be performed parallelly), the processor 120 can calculate a system-wide optimization intervention schedule for assets in the transmission network across the circuits 205a and 205b using another MILP algorithm (e.g., the second MILP algorithm).

Figure 4:
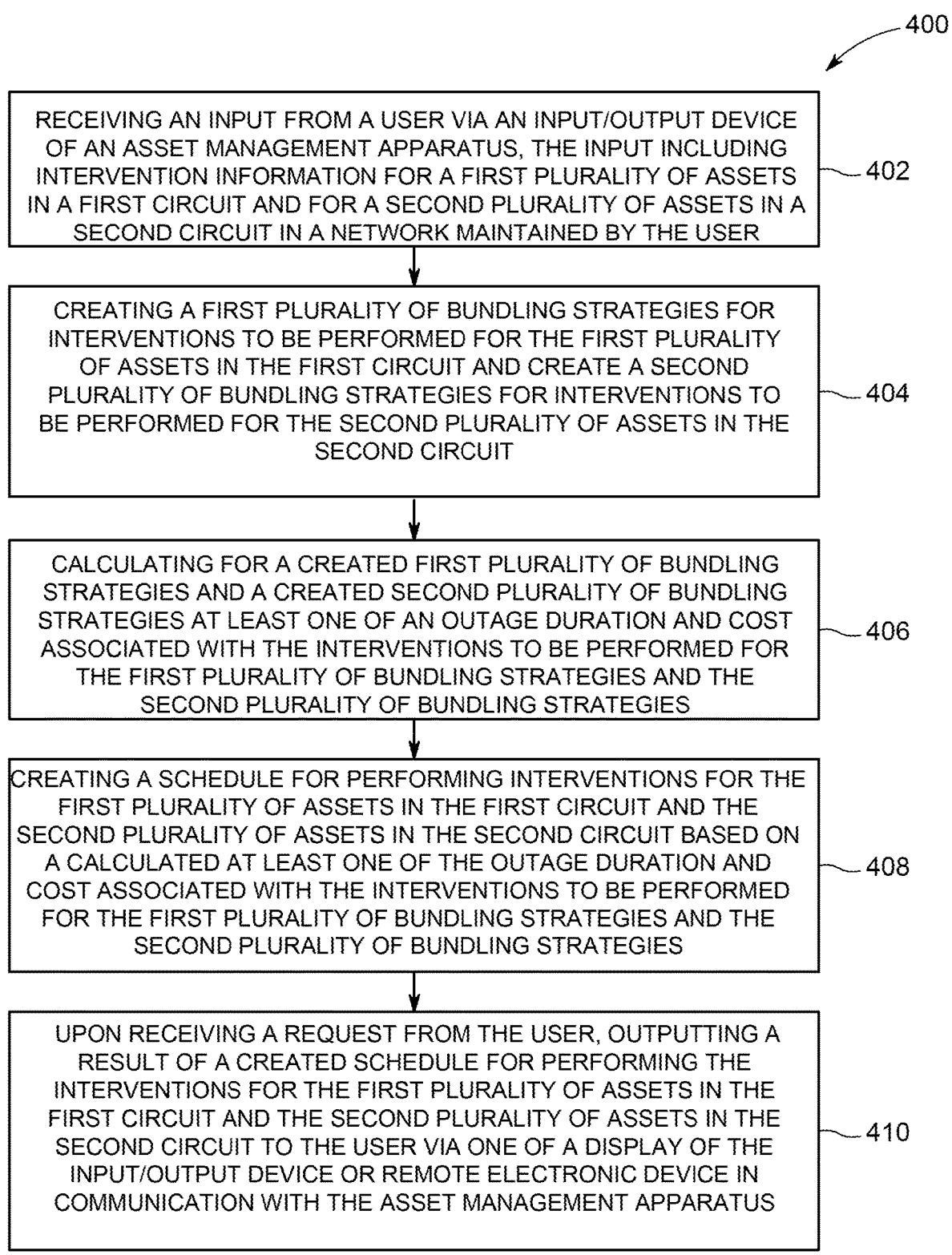
FIG. 4 is a flowchart of a method for asset management, in accordance an embodiment of the present disclosure.

Next, upon receiving a request from the user, the processor 120 can output a result of the created schedule for performing the intervention for the first plurality of assets in the first circuit and the second plurality of assets in the second circuit to the user via one of a display of the input/output device or remote electronic device in communication with the asset management apparatus (see FIG. 4 at 410). For example, the processor 120 can output a GUI 300b (FIG. 3B) that includes a list of the assets, the type of intervention, and a circuit in which the asset is located. Additionally, the GUI 300b can include the estimated outage duration for the circuits, an estimated cost savings by bundling the interventions scheduled for the assets, etc. In at least some embodiments, a selectable area 301b can be displayed in the GUI 300b. For example, the selectable area 301b can be used to save the information in the GUI 300b in the memory 130 and/or can be used to send the information in the GUI 300b to the one or more remote (or external) electronic devices 102, 104 or the server 106.

Using the methods and apparatus described herein, allows a user (or organization) to determine intervention bundling strategies in a relatively quick and cost-effective manner. Additionally, outage costs that are typically associated with performing multiple interventions for assets across different circuits are greatly reduced, as a total duration of the outages of each circuit is reduced by performing the interventions at the same time.

While the herein described methods and apparatus use the asset management application for determining intervention bundling strategies for assets in a circuit of a transmission network, the disclosure is not so limited. For example, the asset management application installed on the electronic device 101 (or the remote electronic devices 102, 104 and/or server 106) can be used for determining intervention bundling strategies for other types of assets that are part of the same network, e.g., pipes, gas pipelines, traffic lights, other utility assets, railroad tracks, network, cable, or any other generalized asset. For example, the asset management application can be used for assets/components that are part of segments in one or more infrastructures, of which one segment in the infrastructure must be disabled in order to do an intervention on an asset (or component) in the disabled segment and/or other segment in the infrastructure. For example, in a gas pipeline network, a network segment can be located between shutoff valves. Accordingly, the asset management application can be configured to perform interventions for assets/components in segments of a plurality of segments in the gas pipeline network. For example, the asset management application can calculate an intervention schedule for assets/components that are located in two or more segments of a plurality of segments in the gas pipeline network. Likewise, the asset management application can be used for multiple different networks, e.g., combined infrastructure, including respective assets. For example, the asset management application can be used for combined assets in circuits in a transmission network and for assets/components in segments of a gas pipeline network.

While the foregoing is directed to embodiments of the present disclosure, other and further embodiments of the disclosure may be devised without departing from the basic scope thereof.

The invention claimed is:

1. An asset management apparatus comprising:
an input/output device; and
a processor programmed to:
receive an input from a user via the input/output device, the input including intervention information for a first plurality of assets in a first circuit and for a second plurality of assets in a second circuit in a network maintained by the user;
create, using a linear algorithm, a first plurality of bundling strategies for interventions to be performed for the first plurality of assets in the first circuit and create a second plurality of bundling strategies for interventions to be performed for the second plurality of assets in the second circuit;
calculate, using a nonlinear algorithm, for a created first plurality of bundling strategies and a created second plurality of bundling strategies at least one of an outage duration and cost associated with the interventions to be performed for the first plurality of bundling strategies and the second plurality of bundling strategies;
create a schedule for performing interventions for the first plurality of assets in the first circuit and the second plurality of assets in the second circuit based on a calculated at least one of the outage duration and cost associated with the interventions to be performed for the first plurality of bundling strategies and the second plurality of bundling strategies; and
upon receiving a request from the user, output a result of a created schedule for performing the interventions for the first plurality of assets in the first circuit and the second plurality of assets in the second circuit to the user via one of a display of the input/output device or remote electronic device in communication with the asset management apparatus.

2. The asset management apparatus of claim 1, wherein the first plurality of assets and the second plurality of assets is at least one of a circuit breaker, power line, transformer or a relay.

3. The asset management apparatus of claim 1, wherein the intervention information for the first plurality of assets and the second plurality of assets comprises at least one of resource constraints for each asset, cost constraints for each asset, cost of outages for each asset, or cost, resource, outage, or other constraints for maintaining all of the first plurality of assets and the second plurality of assets in the network maintained by the user.

4. The asset management apparatus of claim 1, wherein the interventions to be performed for the first plurality of assets and the second plurality of assets are at least one of maintaining, repairing, replacing, or refurbishing the first plurality of assets and the second plurality of assets.

5. The asset management apparatus of claim 1, wherein the network is a power line network.

6. The asset management apparatus of claim 1, wherein each asset of the first plurality of assets and the second plurality of assets has about three to about fifteen types of interventions.

7. A method for asset management comprising:
receiving an input from a user via an input/output device of an asset management apparatus, the input including intervention information for a first plurality of assets in a first circuit and for a second plurality of assets in a second circuit in a network maintained by the user;
creating, using a linear algorithm, a first plurality of bundling strategies for interventions to be performed for the first plurality of assets in the first circuit and create a second plurality of bundling strategies for interventions to be performed for the second plurality of assets in the second circuit;
calculating, using a nonlinear algorithm, for a created first plurality of bundling strategies and a created second plurality of bundling strategies at least one of an outage duration and cost associated with the interventions to be performed for the first plurality of bundling strategies and the second plurality of bundling strategies;
creating a schedule for performing interventions for the first plurality of assets in the first circuit and the second plurality of assets in the second circuit based on a calculated at least one of the outage duration and cost associated with the interventions to be performed for the first plurality of bundling strategies and the second plurality of bundling strategies; and upon receiving a request from the user, outputting a result of a created schedule for performing the interventions for the first plurality of assets in the first circuit and the second plurality of assets in the second circuit to the user via one of a display of the input/output device or remote electronic device in communication with the asset management apparatus.

8. The method of claim 7, wherein the first plurality of assets and the second plurality of assets is at least one of a circuit breaker, power line, transformer or a relay.

9. The method of claim 7, wherein the intervention information for the first plurality of assets and the second plurality of assets comprises at least one of resource constraints for each asset, cost constraints for each asset, cost of outages for each asset, or cost, resource, outage, or other constraints for maintaining all of the first plurality of assets and the second plurality of assets in the network maintained by the user.

10. The method of claim 7, wherein the interventions to be performed for the first plurality of assets and the second plurality of assets are at least one of maintaining, repairing, replacing, or refurbishing the first plurality of assets and the second plurality of assets.

11. The method of claim 7, wherein the network is a power line network.

12. The method of claim 7, wherein each asset of the first plurality of assets and the second plurality of assets has about three to about fifteen types of interventions.

13. A non-transitory computer readable storage medium having stored thereon a plurality of instructions that when executed by a processor of an asset management apparatus perform a method for asset management comprising:

receiving an input from a user via an input/output device, the input including intervention information for a first plurality of assets in a first circuit and for a second plurality of assets in a second circuit in a network maintained by the user;

creating, using a linear algorithm, a first plurality of bundling strategies for interventions to be performed for the first plurality of assets in the first circuit and create a second plurality of bundling strategies for interventions to be performed for the second plurality of assets in the second circuit;

calculating, using a nonlinear algorithm, for a created first plurality of bundling strategies and a created second plurality of bundling strategies at least one of an outage duration and cost associated with the interventions to be performed for the first plurality of bundling strategies and the second plurality of bundling strategies;

creating a schedule for performing interventions for the first plurality of assets in the first circuit and the second plurality of assets in the second circuit based on a calculated at least one of the outage duration and cost associated with the interventions to be performed for the first plurality of bundling strategies and the second plurality of bundling strategies; and upon receiving a request from the user, outputting a result of a created schedule for performing the interventions for the first plurality of assets in the first circuit and the second plurality of assets in the second circuit to the user via one of a display of the input/output device or remote electronic device in communication with the asset management apparatus.

14. The non-transitory computer readable storage medium of claim 13, wherein the first plurality of assets and the second plurality of assets is at least one of a circuit breaker, power line, transformer or a relay.

15. The non-transitory computer readable storage medium of claim 13, wherein the intervention information for the first plurality of assets and the second plurality of assets comprises at least one of resource constraints for each asset, cost constraints for each asset, cost of outages for each asset, or cost, resource, outage, or other constraints for maintaining all of the first plurality of assets and the second plurality of assets in the network maintained by the user.

16. The non-transitory computer readable storage medium of claim 13, wherein the interventions to be performed for the first plurality of assets and the second plurality of assets are at least one of maintaining, repairing, replacing, or refurbishing the first plurality of assets and the second plurality of assets.

17. The non-transitory computer readable storage medium of claim 13, wherein the network is a power line network.

18. The non-transitory computer readable storage medium of claim 13, wherein each asset of the first plurality of assets and the second plurality of assets has about three to about fifteen types of interventions.

* * * * *